US008059115B2

(12) United States Patent
Matsuki et al.

(10) Patent No.: US 8,059,115 B2

(45) Date of Patent: Nov. 15, 2011

(54) SOURCE DRIVING CIRCUIT OF LCD APPARATUS

(75) Inventors: Fumirou Matsuki, Hyogo (JP); Kazuyuki Hashimoto, Hyogo (JP)

(73) Assignee: Chimei Innolux Corporation (TW)

( * ) Notice: Subject to any disclaimer, the term of this patent is extended or adjusted under 35 U.S.C. 154(b) by 483 days.

(21) Appl. No.: 12/405,412

(22) Filed: Mar. 17, 2009

(65) Prior Publication Data

US 2009/0231321 A1 Sep. 17, 2009

(30) Foreign Application Priority Data

Mar. 17, 2008 (JP) ................................ 2008-067646

(51) Int. Cl.
*G06F 3/038* (2006.01)

(52) U.S. Cl. ........................................................ 345/212

(58) Field of Classification Search .................. 345/212, 345/211, 204, 100, 98, 96, 87, 51; 330/257, 330/253, 255, 297, 252

See application file for complete search history.

(56) References Cited

U.S. PATENT DOCUMENTS 4,166,983 A * 9/1979 Lacroix ......................... 330/297
4,661,781 A * 4/1987 Van Tuijl ...................... 330/255
5,166,632 A * 11/1992 MacKenzie .................. 327/323
5,731,796 A * 3/1998 Furuhashi et al. .............. 345/96
6,127,995 A * 10/2000 Furuhashi et al. .............. 345/96
6,316,995 B1 * 11/2001 Chen et al. ..................... 330/252
6,384,807 B1 * 5/2002 Furuhashi et al. .............. 345/96
7,038,649 B2 * 5/2006 Furuhashi et al. .............. 345/96
7,605,830 B2 * 10/2009 Date ............................. 345/690
7,639,059 B1 * 12/2009 Yu et al. ......................... 327/333
2006/0125764 A1 * 6/2006 Furuhashi et al. .............. 345/98
2007/0229442 A1 * 10/2007 Yi ................................ 345/100

* cited by examiner

*Primary Examiner* — Fred Tzeng

(74) *Attorney, Agent, or Firm* — Lowe Hauptman Ham & Berner, LLP

(57) ABSTRACT

A source driver circuit of an LCD apparatus with a small occupied area and low power consumption is disclosed. The source driver circuit comprises a reference voltage circuit, a negative voltage driving DAC, a positive voltage driving DAC, an invert amplifier, a non-invert amplifier and a voltage selector. The reference voltage circuit generates a reference voltage. The negative voltage driving DAC divides the display data into negative gradation voltages. The positive voltage driving DAC divides the display data into positive gradation voltages. The invert amplifier works as an analogue buffer for the negative gradation voltages for driving the LCD apparatus and the non-invert amplifier works as an analogue buffer for the positive gradation voltages for driving the LCD apparatus. The voltage selector provides the reference voltage to the positive and negative voltage driving DACs.

9 Claims, 6 Drawing Sheets

SOURCE DRIVING CIRCUIT OF LCD APPARATUS

RELATED APPLICATIONS

The present application is based on, and claims priority from, Japanese Application Number 2008-067646, filed Mar. 17, 2008, the disclosure of which is hereby incorporated by reference herein in its entirety.

BACKGROUND OF THE INVENTION

1. Field of the Invention

The present invention generally relates to a source driver circuit, and more particularly to a source driver circuit of an LCD apparatus.

2. Description of Prior Art

Please refer to FIG. 6, which shows a diagram of a driving circuit of an LCD apparatus according to prior art first. As shown in FIG. 6, the LCD apparatus of prior art mainly comprises a TFT liquid crystal panel 1, a display controller 2 and a gate driver circuit 3 for controlling gate electrodes of the TFT liquid crystal panel 1. The display controller 2 generates a gate driving control signal 4 to control the gate driver circuit 3 and transmits thereto. Furthermore, the LCD apparatus of prior art further comprises a source driver circuit. The source driver circuit includes reference voltage circuits 5 and 6, voltage selectors 7 and 8, DACs 9 and 10 (Digital to Analog Converter), non-invert amplifiers 11 and 12, a shift register 14, a level shifter 15, and a demultiplexer 16. The reference voltage circuits 5 and 6 transform digital display data into gradation voltage signals according to the reference voltages. The DACs 9 and 10 convert voltage data from the voltage selectors 7 and 8 into analog signals respectively. The non-invert amplifier 11 works as an analogue buffer for applying the analogue signals from DAC 9 to the TFT liquid crystal panel 1. The non-invert amplifier 12 also works as an analogue buffer for applying the analogue signals from DAC 10 to the TFT liquid crystal panel 1. The level shifter 15 raises the outputted voltage level of the shift register 14.

The non-invert amplifiers 11 and 12 output display signals 13 that drive the TFT liquid crystal panel 1 to the demultiplexer 16. Furthermore, the display controller 2 transmits a timing signal 17 to the shift register 14 for transmitting the display signals 13 from the demultiplexer 16 to the TFT liquid crystal panel 1. In the meantime, the display controller 2 also transmits a transfer clock 18 to the shift register 14. Moreover, the display controller 2 transmits pulses 19 to the level shifter 15 according to the transfer clock 18.

The display controller 2 outputs the gate driving control signals 4 to the gate driver circuit 3. And then, the controlled gate driver circuit 3 activates any one gate control line of the TFT liquid crystal panel 1.

Display data are the gradation voltage signals which are generated by the reference voltage circuits 5 and 6 for applying to the TFT liquid crystal panel 1. Then, the gradation voltage signals are converted by the DACs 9 and 10. The analog signals obtained by aforesaid conversion are inputted into the non-invert amplifiers 11 and 12. For cyclically reversing the polarities of the gradation voltages applied to the TFT liquid crystal panel 1, the reference voltage circuits 5 and 6, the voltage selectors 7 and 8, the DACs 9 and 10, the non-invert amplifiers 11 and 12 are all the essential elements during driving the liquid crystals.

More specifically, the LCD apparatus of prior arts needs a positive reference voltage circuit 5 and a negative reference voltage circuit 6 for cyclically reversing the polarities of the gradation voltages of driving the liquid crystals of the TFT panel 1. Correspondingly, two voltage selectors 7 and 8, two DACs 9 and 10, two non-invert amplifiers 11 and 12 become necessary. Therefore, an occupied area of the source driver circuit is large and power consumption thereof is also high. For a tendency towards microminiaturization and low power consumption of LCD apparatus s, there is a need to resolve the aforesaid drawbacks to satisfy demands for microminiaturization and low power consumption of LCD apparatus.

SUMMARY OF THE INVENTION

An objective of the present invention is to provide a source driver circuit for an LCD apparatus with a small occupied area and low power consumption.

For solving the problems, the present invention provides a source driver circuit that includes a reference voltage circuit and a voltage selector. The reference voltage circuit and the voltage selector are shared by a positive voltage driving system and a negative voltage driving system. By employing an invert amplifier and a non-invert amplifier thereof, the source driver circuit of the present invention is capable of outputting LCD display signals with different polarities respectively.

The source driver circuit of the LCD apparatus according to the present invention comprises a reference voltage (Gamma) circuit, a negative voltage driving DAC, a positive voltage driving DAC, an invert amplifier, a non-invert amplifier and a voltage selector. The reference voltage circuit generates a reference voltage. The negative voltage driving DAC divides display data into negative gradation voltages. The positive voltage driving DAC divides the display data into positive gradation voltages. The invert amplifier provides the negative gradation voltages for driving the LCD apparatus and the non-invert amplifier provides the positive gradation voltages for driving the LCD apparatus. The voltage selector selectively provides the reference voltage from the reference voltage circuit for the positive voltage driving DAC and the negative voltage driving DAC. Specifically, the reference voltage circuit and the voltage selector are shared by the positive voltage driving system and the negative voltage driving system so that the source driver circuit can have a small occupied area and low power consumption.

The foregoing positive voltage driving system includes the reference voltage circuit, the voltage selector, the positive voltage driving DAC and the non-invert amplifier. The foregoing negative voltage driving system includes the reference voltage circuit, the voltage selector, the negative voltage driving DAC and the invert amplifier. Accordingly, a source driver circuit with a small occupied area and low power consumption can be achieved and applied in an LCD apparatus according to the present invention.

Furthermore, the source driver circuit of the present invention further comprises a select switch. The select switch is coupled to the positive voltage driving DAC, the negative voltage driving DAC and the voltage selector respectively. The select switch is capable of selectively and alternately switching the reference voltage from the voltage selector outputted to the positive voltage driving DAC and the negative voltage driving DAC.

Moreover, the source driver circuit of the present invention can be employed in an LCD apparatus for driving the liquid crystal panel thereof. Furthermore, the LCD apparatus having the source driver circuit of the present invention can be applied in an electronic device. The electronic device can be a cellular phone, a digital camera, a Personal Digital Assistant, a media display in car, a display for airplane, a digital frame and a portable DVD player.

In conclusion, the source driver circuit of the LCD apparatus provided by the present invention can have advantages of a small occupied area and low power consumption than prior arts.

DETAILED DESCRIPTION OF THE INVENTION

Figure 1:
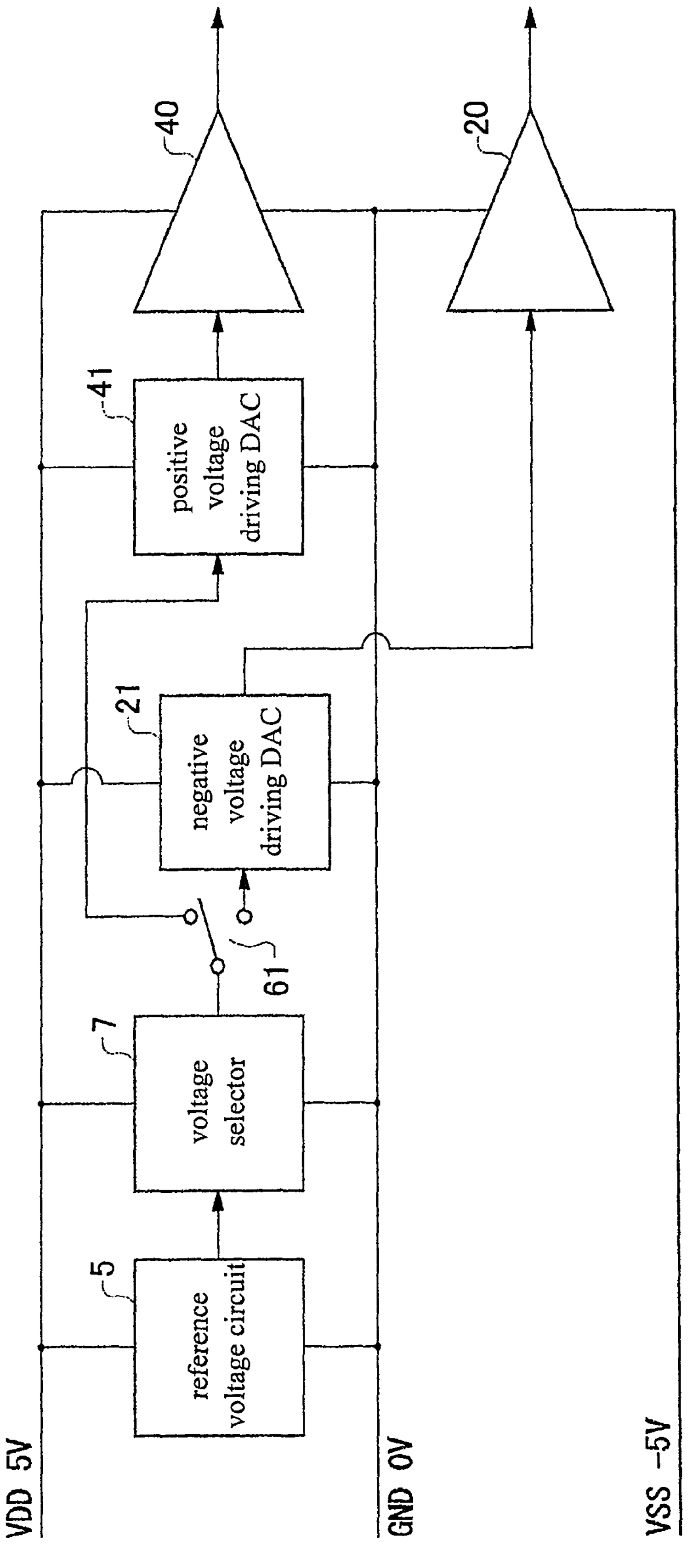
FIG. 1 depicts a functional block diagram of a source driving circuit of an LCD display according to the present invention.

Refer to FIG. 1, which depicts a functional block diagram of a source driving circuit of an LCD apparatus according to the present invention. As shown in FIG. 1, the source driving circuit of the LCD apparatus according to the present invention comprises a reference voltage circuit 5 (Gamma circuit), a voltage selector 7, a negative voltage driving DAC 21, a positive voltage driving DAC 41, an invert amplifier 20, a non-invert amplifier 40 and a select switch 61. The reference voltage circuit 5 generates a reference voltage and transforms display data into gradation voltage signals according to the reference voltage. The voltage selector 7 is employed to make a choice a plurality of reference voltages.

A positive voltage driving system of the source driving circuit includes the reference voltage circuit 5, the voltage selector 7, the positive voltage driving DAC 41 and the non-invert amplifier 40. A negative voltage driving system of the source driving circuit includes the reference voltage circuit 5, the voltage selector 7, the negative voltage driving DAC 21 and the invert amplifier 20. The reference voltage circuit 5 and the voltage selector 7 are shared by the positive voltage driving system and the negative voltage driving system. With the select switch 61, the output of the voltage selector 7 to the negative voltage driving DAC 21 and the positive voltage driving DAC 41 can be selectively and alternately switched. The negative voltage driving DAC 21 converts gradation voltage signals from the voltage selector 7 into analog signals. The invert amplifier 20 inverts the analog signals from the voltage selector 7 and works as an analogue buffer for applying the inverted signal to the TFT liquid crystal panel. The positive voltage driving DAC 41 converts gradation voltage signals from the voltage selector 7 into analog signals. The non-invert amplifier 40 works as an analogue buffer for applying the signal from DAC 41 to the TFT liquid crystal panel without converting the analog signals from the positive driving DAC. Accordingly, comparing with prior arts, one reference voltage circuit and one voltage selector can be omitted, so that it can decrease the occupied area of the source driving circuit.

Figure 2:
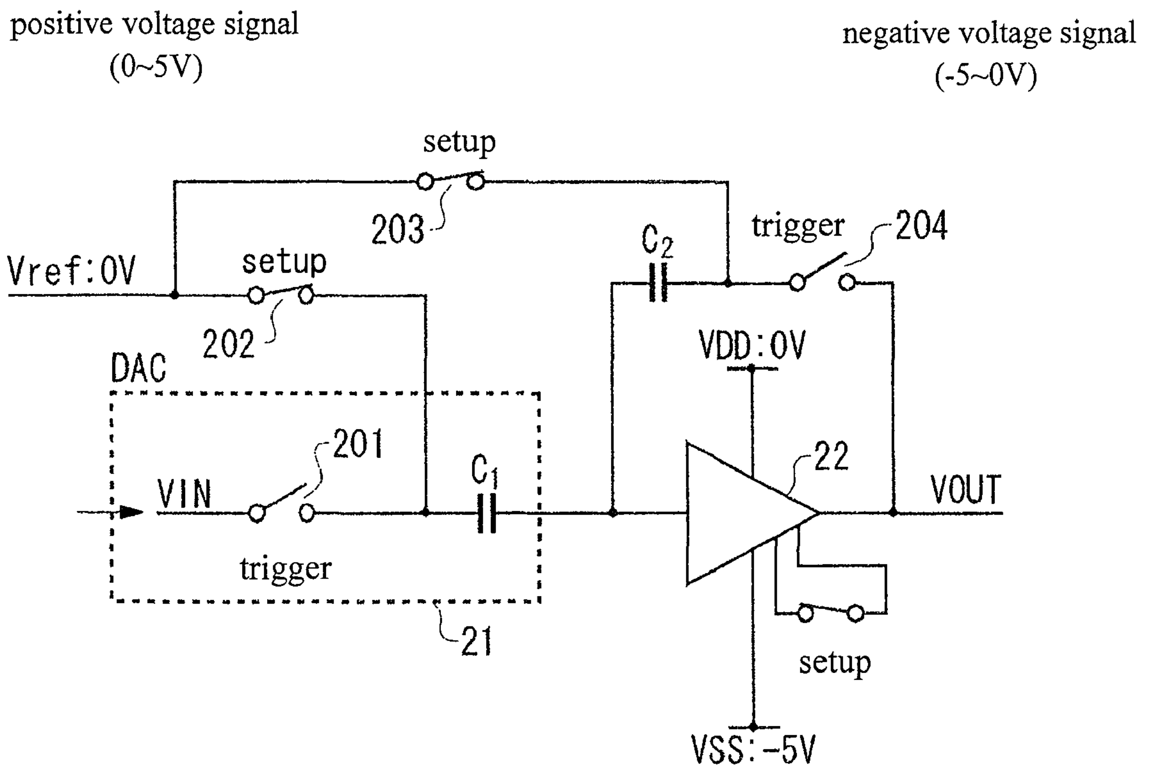
FIG. 2 depicts a combination diagram of a negative voltage driving DAC of a negative voltage driving system and an invert amplifier shown in FIG. 1 according to an embodiment of the present invention.

Refer to FIG. 2, which depicts a combination diagram of a negative voltage driving DAC 21 of a negative voltage driving system and an invert amplifier 20 shown in FIG. 1 according to an embodiment of the present invention. As shown in FIG. 2, the circuit of the negative voltage driving system mainly comprises the negative voltage driving DAC 21 and an amplifier 22. The negative voltage driving DAC 21 comprises a trigger switch 201 and storage capacitor C1. In addition, the driving procedure is executed with two stages. In the initial setup stage, the voltage of the storage capacitor C1 is reset as a reference voltage 0 and the amplifier 22 is initialized. In the trigger stage thereafter, the reference voltage from the voltage selector is inputted into the storage capacitor C1 and the negative feedback capacitor C2 to proceed with the D/A conversion. And then, through the amplifier 22, negative voltages are outputted to pixels of the TFT liquid crystal panel.

Figure 3:
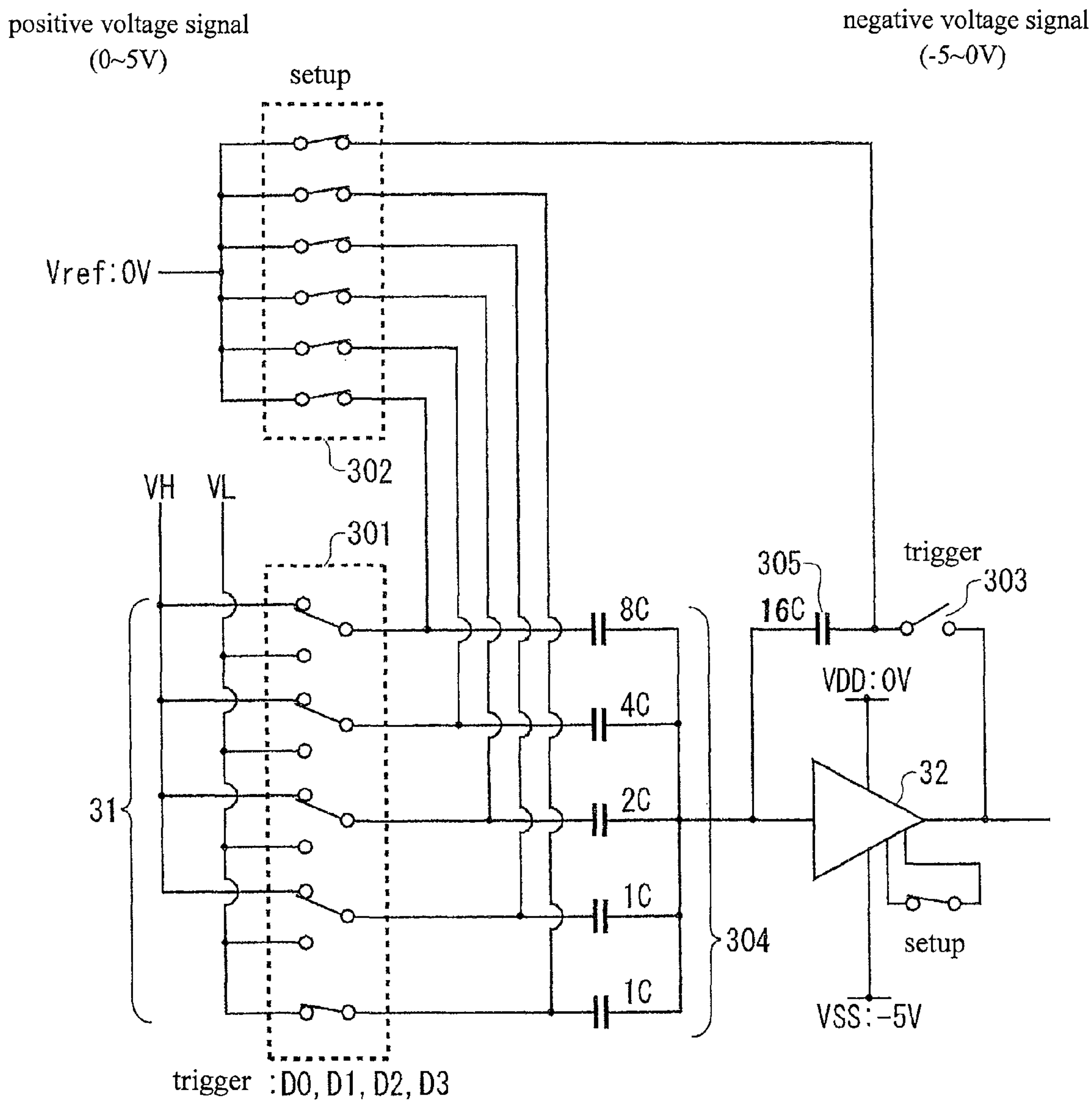
FIG. 3 depicts a detail diagram of an embodiment of a negative voltage driving DAC shown in FIG. 2 and an invert amplifier shown in FIG. 1.

Refer to FIG. 3, which depicts a detail diagram of an embodiment of a negative voltage driving DAC 21 shown in FIG. 2 and an invert amplifier 20 shown in FIG. 1. The circuit comprises a negative voltage driving DAC 31, an amplifier 32, a trigger switch 301, a setup switch 302, a trigger switch 303, storage capacitors 304 (8C, 4C, 2C, 1C, 1C) and a negative feedback capacitor 305 (16C). The storage capacitors 304 (8C, 4C, 2C, 1C, 1C) are employed to input voltage to the amplifier 32. The trigger switch 301 is employed to switch the input voltage (VH, VL) to the storage capacitors 304. The setup switch 302 is employed to input the reference voltage (Vref) to the negative feedback capacitor 305, the negative voltage driving DAC 31 and the storage capacitors 304. The trigger switch 303 is located between the amplifier 32 and the output terminal.

Hence, the terminals of the voltage selector (VH, VL) are coupled with the storage capacitor 304 through the trigger switch 301. For inputting the reference voltage (Vref) into the storage capacitor 304 and the negative feedback capacitor 305, the reference voltage terminal is coupled with the input terminal of the storage capacitor 304 and the input terminal the negative feedback capacitor 305. Moreover, the ground terminal of the storage capacitor 304 and that of the negative feedback capacitor 305 are coupled with the input terminal of the amplifier 32. The input terminal of the negative feedback capacitor 305 is coupled to the output terminal of the amplifier 32 through the trigger switch 303. The negative voltage driving DAC 31 provides the reference voltage (Vref: 0V) through the setup switch 302. Then, the negative voltage driving DAC 31 selects a reference voltage through the trigger switch 301 from the terminals of the voltage selector (VH, VL) and inputs the reference voltage to corresponding storage capacitors 304 (one of the 8C, 4C, 2C, 1C, 1C) to proceed the D/A conversion, and divides the display data into gradation voltages. Thereafter, the amplifier 22 is used to invert the gradation voltages and works as an analogue buffer for applying negative gradation voltages to pixels of the TFT liquid crystal panel.

Figure 4:
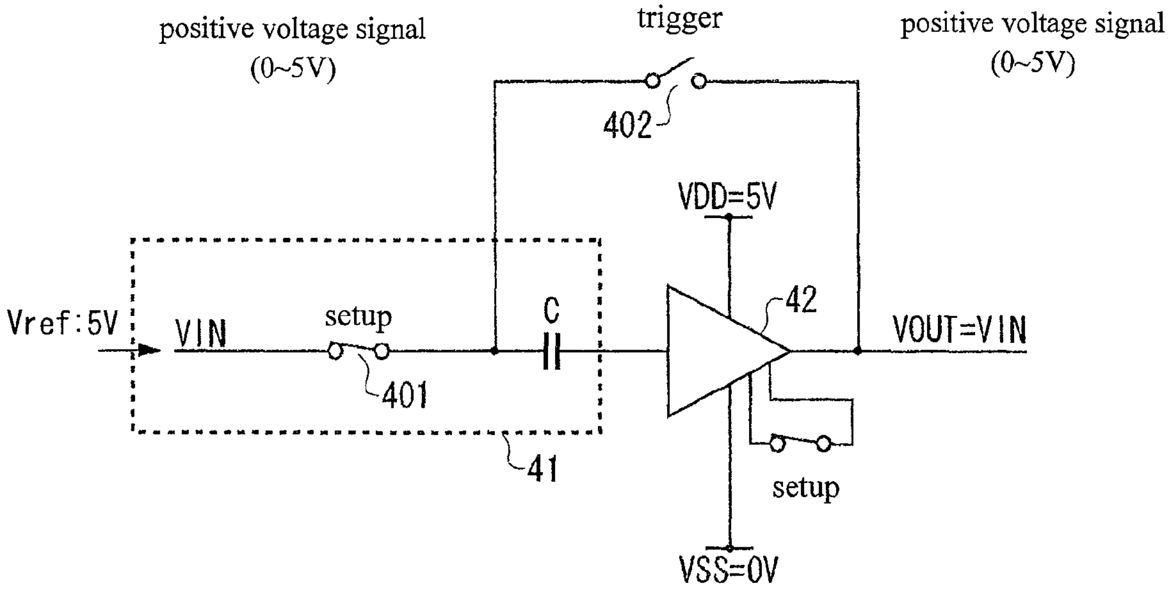
FIG. 4 depicts a combination diagram of a positive voltage driving DAC of a positive voltage driving system and a non-invert amplifier shown in FIG. 1 according to an embodiment of the present invention.

Refer to FIG. 4, which depicts a combination diagram of a positive voltage driving DAC 41 of a positive voltage driving system and a non-invert amplifier 40 shown in FIG. 1, according to an embodiment of the present invention. As shown in FIG. 4, the circuit of the positive voltage driving system mainly comprises the positive voltage driving DAC 41 and an amplifier 42. The positive voltage driving DAC 41 comprises a setup switch 401 and a storage capacitor C. In addition, the driving procedure is executed with two stages. In the initial setup stage, first, the reference voltage from the voltage selector is inputted to the storage capacitor C to proceed the D/A conversion and initialize the amplifier 42. In the trigger stage thereafter, through the amplifier 42, the suitable positive voltages are outputted to pixels of the TFT panel.

Figure 5:
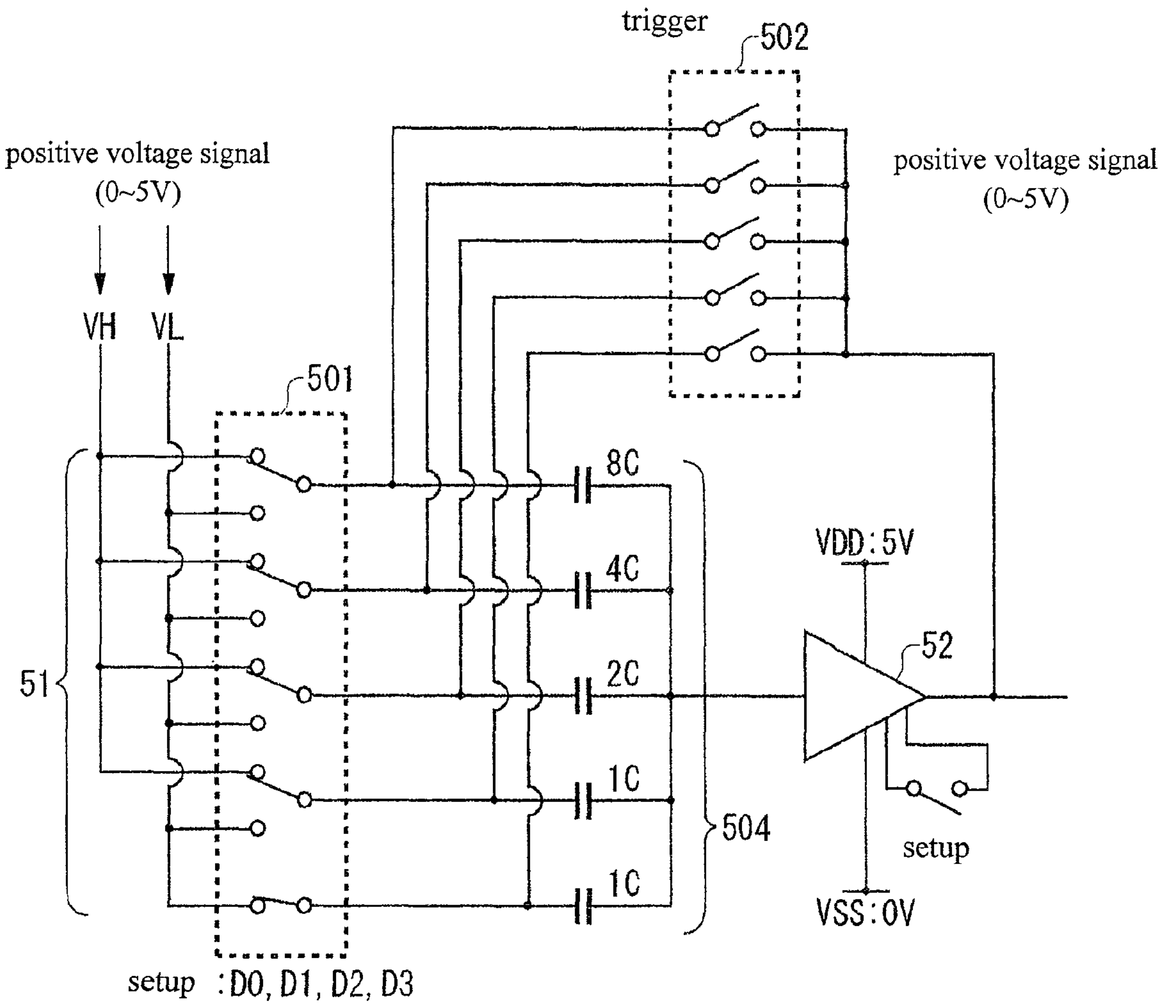
FIG. 5 depicts a detail diagram of an embodiment of a positive voltage driving DAC shown in FIG. 4 and a non-invert amplifier shown in FIG. 1.
Figure 6:
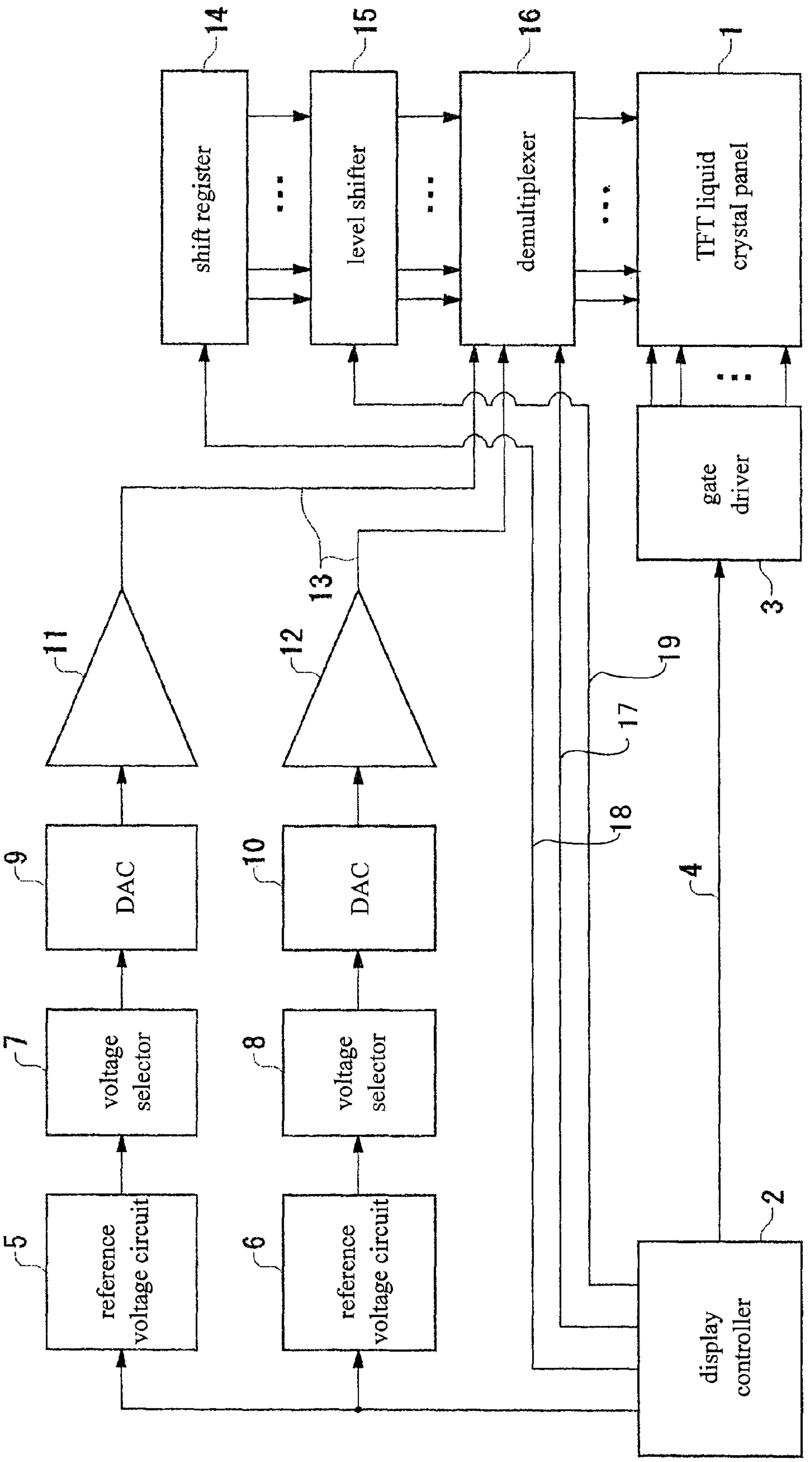
FIG. 6 shows a diagram of a driving circuit of an LCD apparatus according to prior art.

Refer to FIG. 5, which depicts a detail diagram of an embodiment of a positive voltage driving DAC 41 shown in FIG. 4 and a non-invert amplifier 40 shown in FIG. 1. The circuit comprises a positive voltage driving DAC 51, an amplifier 52, a setup switch 501, a trigger switch 502 and storage capacitors 504 (8C, 4C, 2C, 1C, 1C). The setup switch is employed to switch the input voltage (VH, VL) to the storage capacitors 504. The trigger switch 502 is located between the input terminal of the storage capacitors 504 and the final output terminal of the circuit.

Hence, the output terminals of the voltage selector (VH, VL) are coupled with the storage capacitor 504 through the setup switch 501. For inputting the reference voltages into the storage capacitor 504, the reference voltage terminal is coupled with the input terminal of the storage capacitors 504 through the setup switch 501. Moreover, the ground terminal of the storage capacitor 504 is coupled with the input terminal of the amplifier 52. The input terminal of the storage capacitors 504 is coupled to the output terminal of the amplifier 52 through the trigger switch 502. The positive voltage driving DAC 51 selects a reference voltage through the setup switch 501 from the terminals of the voltage selector (VH, VL) and inputs the reference voltage to corresponding storage capacitors 504 (one of the 8C, 4C, 2C, 1C, 1C) to proceed the D/A conversion, and divides the display data into gradation voltages. Thereafter, the amplifier 52 works as an analogue buffer for applying the positive gradation voltages to the pixels of the TFT liquid crystal panel.

The LCD apparatus having the source driver circuit of the present invention can be applied in a cellular phone, a digital camera, a PDA (Personal Digital Assistant), an automotive display, a navigation display, a digital frame and a portable DVD player.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A source driver circuit of an LCD apparatus, comprising:

a reference voltage circuit, generating a reference voltage;

a negative voltage driving DAC, dividing display data into negative gradation voltages;

a positive voltage driving DAC, dividing the display data into positive gradation voltages;

an invert amplifier, providing the negative gradation voltages for driving the LCD apparatus;

a non-invert amplifier, providing the positive gradation voltages for driving the LCD apparatus; and a voltage selector, selectively providing the reference voltage from the reference voltage circuit for the positive voltage driving DAC and the negative voltage driving DAC.

2. The source driver circuit according to claim 1, further comprising a select switch, coupled to the positive voltage driving DAC, the negative voltage driving DAC and the voltage selector.

3. The source driver circuit according to claim 2, wherein the select switch can alternately switch the reference voltage from the voltage selector outputted to the positive voltage driving DAC and the negative voltage driving DAC.

4. The source driver circuit according to claim 3, wherein the LCD apparatus having the source driver circuit is applied in an electronic device.

5. The source driver circuit according to claim 4, wherein the electronic device is selected from a cellular phone, a digital camera, a Personal Digital Assistant, a media display in car, a display for airplane, a digital frame and a portable DVD player.

6. The source driver circuit according to claim 2, wherein the LCD apparatus having the source driver circuit is applied in an electronic device.

7. The source driver circuit according to claim 6, wherein the electronic device is selected from a cellular phone, a digital camera, a Personal Digital Assistant, a media display in car, a display for airplane, a digital frame and a portable DVD player.

8. The source driver circuit according to claim 1, wherein the LCD apparatus having the source driver circuit is applied in an electronic device.

9. The source driver circuit according to claim 8, wherein the electronic device is selected from a cellular phone, a digital camera, a Personal Digital Assistant, a media display in car, a display for airplane, a digital frame and a portable DVD player.

* * * * *